US011287084B1

(12) United States Patent
Carnevali et al.

(10) Patent No.: US 11,287,084 B1
(45) Date of Patent: Mar. 29, 2022

(54) HOLDER FOR SCANNER GUNS AND OTHER DEVICES AND METHODS OF MAKING AND USING

(71) Applicant: National Products, Inc., Seattle, WA (US)

(72) Inventors: Jeffrey D. Carnevali, Seattle, WA (US); Stefan Michael Gottschalk, Seattle, WA (US)

(73) Assignee: National Products, Inc., Seattle, WA (US)

( * ) Notice: Subject to any disclaimer, the term of this patent is extended or adjusted under 35 U.S.C. 154(b) by 0 days.

(21) Appl. No.: 17/032,752

(22) Filed: Sep. 25, 2020

(51) Int. Cl.
*F16M 13/02* (2006.01)

(52) U.S. Cl.
CPC ................ *F16M 13/022* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,215,815 A | * | 11/1965 | Lerner | B23K 3/027 219/242 |
| 3,348,116 A | * | 10/1967 | Freeman | H01R 24/68 320/115 |
| 4,621,189 A | * | 11/1986 | Kumar | G06K 7/109 235/454 |
| 4,874,142 A | * | 10/1989 | Gelatt | A45D 20/12 248/185.1 |
| 4,878,642 A | | 11/1989 | Kirby, Jr. | |
| 4,910,385 A | * | 3/1990 | Shye-Long | A45D 20/12 200/332.2 |
| 5,132,523 A | * | 7/1992 | Bassett | G06K 7/10871 235/455 |
| 5,155,346 A | | 10/1992 | Doing et al. | |
| 5,200,597 A | | 4/1993 | Eastman et al. | |
| 5,285,056 A | * | 2/1994 | Tedesco | G06K 7/10881 235/438 |
| 5,465,207 A | * | 11/1995 | Boatwright | B60R 11/02 701/52 |
| 5,508,505 A | | 4/1996 | Walts et al. | |
| 5,521,370 A | * | 5/1996 | Hanson | B60R 11/02 235/462.46 |
| 5,576,531 A | | 11/1996 | Murphy | |
| 5,588,055 A | | 12/1996 | Williamson et al. | |
| D377,886 S | | 2/1997 | Colton | |
| 5,627,727 A | * | 5/1997 | Aguilera | G06F 1/1626 361/679.43 |
| 5,687,874 A | | 11/1997 | Omori et al. | |
| 5,709,429 A | | 1/1998 | Bergin | |
| 5,736,726 A | | 4/1998 | VanHorn et al. | |
| 5,845,885 A | | 12/1998 | Carnevali | |
| 5,860,559 A | | 1/1999 | Wang | |

(Continued)

*Primary Examiner* — Monica E Millner
(74) *Attorney, Agent, or Firm* — Branch Partners PLLC; Bruce E. Black (57) ABSTRACT

A holder for a device having a handle includes a body having an open first end, a second end opposite the first end, and at least one sidewall extending from the first end to the second end and defining a handle-receiving cavity configured to receive the handle of the device; and a first opening formed in the at least one sidewall of the body and configured to receive a portion of the handle to retain the handle in the holder and resist removal of the handle from the holder.

20 Claims, 7 Drawing Sheets

(56) References Cited

U.S. PATENT DOCUMENTS

| | | | | |
|---|---|---|---|---|
| 5,947,432 A * | 9/1999 | Reddin | F16M 13/022 | |
| | | | 248/206.4 | |
| 5,949,052 A | 9/1999 | Longacre, Jr. et al. | | |
| 6,039,206 A | 3/2000 | DeFrancesco | | |
| 6,053,413 A | 4/2000 | Swift et al. | | |
| 6,561,476 B2 | 5/2003 | Carnevali | | |
| 6,595,422 B1 | 7/2003 | Doljack | | |
| 6,616,049 B1 | 9/2003 | Barkan et al. | | |
| 6,644,524 B1 | 11/2003 | Garvin | | |
| 6,672,554 B2 | 1/2004 | Fukuo | | |
| 6,802,265 B1 | 10/2004 | Dodson et al. | | |
| 6,860,427 B1 | 3/2005 | Schmidt et al. | | |
| 7,040,590 B2 * | 5/2006 | Carnevali | B60N 3/103 | |
| | | | 248/309.1 | |
| 7,077,370 B2 * | 7/2006 | Lin | A45D 20/12 | |
| | | | 248/176.2 | |
| 7,261,238 B1 * | 8/2007 | Carlson | G06K 7/10851 | |
| | | | 235/462.08 | |
| 7,525,696 B2 * | 4/2009 | Carnevali | G06K 7/10881 | |
| | | | 358/473 | |
| 7,594,631 B1 | 9/2009 | Carnevali | | |
| 8,186,636 B2 | 5/2012 | Carnevali | | |
| 8,251,157 B2 * | 8/2012 | Gray | H01M 50/213 | |
| | | | 173/29 | |
| 8,550,357 B2 * | 10/2013 | Kearney | G06K 7/109 | |
| | | | 235/472.02 | |
| 8,590,795 B2 | 11/2013 | Vincenzi | | |
| 8,602,376 B2 | 12/2013 | Vogel et al. | | |
| 9,839,313 B1 * | 12/2017 | Gaudet | G06K 7/10366 | |
| 9,881,292 B2 * | 1/2018 | Hicks | G06Q 20/208 | |
| 10,176,351 B2 * | 1/2019 | Volta | G06K 7/1408 | |
| 10,378,690 B2 | 8/2019 | Carnevali | | |
| 10,473,150 B2 | 11/2019 | Carnevali et al. | | |
| 2003/0102419 A1 | 6/2003 | Carnevali | | |
| 2005/0082371 A1 | 4/2005 | Schmidt et al. | | |
| 2007/0117419 A1 | 5/2007 | Kalis et al. | | |
| 2008/0023606 A1 | 1/2008 | Kalis et al. | | |
| 2009/0050758 A1 | 2/2009 | Carnevali | | |
| 2009/0057422 A1 | 3/2009 | Dugas et al. | | |
| 2009/0108151 A1 | 4/2009 | Carnevali | | |
| 2009/0218405 A1 | 9/2009 | Joseph et al. | | |
| 2010/0311337 A1 * | 12/2010 | Riviere | G06F 3/023 | |
| | | | 455/41.3 | |
| 2011/0073658 A1 | 3/2011 | Vassura et al. | | |
| 2015/0030386 A1 | 1/2015 | Carnevali | | |
| 2015/0220765 A1 * | 8/2015 | Carnevali | G06K 7/10881 | |
| | | | 235/462.45 | |

\* cited by examiner

HOLDER FOR SCANNER GUNS AND OTHER DEVICES AND METHODS OF MAKING AND USING

FIELD

The present invention is directed to a holder for a scanner gun or other device with a handle. The present invention is also directed to mounting arrangements including a holder for a scanner gun or other device with a handle.

BACKGROUND

Providing holders or mounts for holding, retaining, or securing objects has proven beneficial for many different uses. For example, scanner guns are useful in many commercial establishments. Providing a reliable holder for the scanner gun, as well as flexible mounting arrangements for the holder, can be useful.

BRIEF SUMMARY

One embodiment is a holder for a device having a handle, the holder includes a body having an open first end, a second end opposite the first end, and at least one sidewall extending from the first end to the second end and defining a handle-receiving cavity configured to receive the handle of the device; and a first opening formed in the at least one sidewall of the body and configured to receive a portion of the handle to retain the handle in the holder and resist removal of the handle from the holder.

In at least some embodiments, the sidewall includes a first tab extending into the first opening and configured to engage the portion of the handle to retain the handle in the holder and resist removal of the handle from the holder. In at least some embodiments, the first tab includes a curved portion that is biased inwardly into the handle-receiving cavity.

In at least some embodiments, the holder further includes a second opening formed in the at least one sidewall of the body (optionally opposite the first opening). In at least some embodiments, the sidewall further includes a second tab extending into the second opening and configured to engage another portion of the handle to push the handle toward the first opening. In at least some embodiments, the second tab includes a curved portion that is biased inwardly into the handle-receiving cavity.

In at least some embodiments, the body defines a rim at the open first end and a handle depression in the rim to accommodate a portion of the handle or a trigger on the handle. In at least some embodiments, the second end is closed. In at least some embodiments, the holder further includes a mounting arrangement disposed on the second end of the holder and configured for coupling a mounting device.

Another embodiment is a holder for a scanner gun having a scanner device and a handle coupled to the scanner device. The holder includes a body having an open first end and at least one sidewall defining a handle-receiving cavity configured to receive the handle of the scanner gun; a first opening formed in the at least one sidewall; a first tab formed in the sidewall of the body and extending into the first opening; a second opening formed in the at least one sidewall (optionally opposite the first opening); and a second tab formed in the sidewall of the body and extending into the second opening, wherein the first and second openings are disposed nearer the second end than the first end.

In at least some embodiments, the first tab includes a portion that is biased inwardly into the handle-receiving cavity. In at least some embodiments, the second tab includes a portion that is biased inwardly into the handle-receiving cavity. In at least some embodiments, the holder is configured to secure the handle of the scanner gun when a distal portion of the handle is inserted into the handle-receiving cavity past the first and second tabs, wherein the second tab is configured to push the handle toward the first tab and the first tab is configured to act as a stop for removal of the handle from the barrel.

In at least some embodiments, the body defines a rim at the open first end and a handle depression in the rim to accommodate a portion of the handle or a trigger on the handle. In at least some embodiments, the second end is closed. In at least some embodiments, the holder further includes a mounting arrangement disposed on the second end of the holder and configured for coupling a mounting device.

Yet another embodiment is a mounting system that includes any of the holders describe above and a mounting device coupled, or coupleable, to the holder. In at least some embodiments, the mounting device includes a ball mount coupled, or coupleable, to the mounting arrangement of the holder. In at least some embodiments, the mounting device includes a clamp.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to a holder for a scanner gun or other device with a handle. The present invention is also directed to mounting arrangements including a holder for a scanner gun or other device with a handle.

Figure 1:
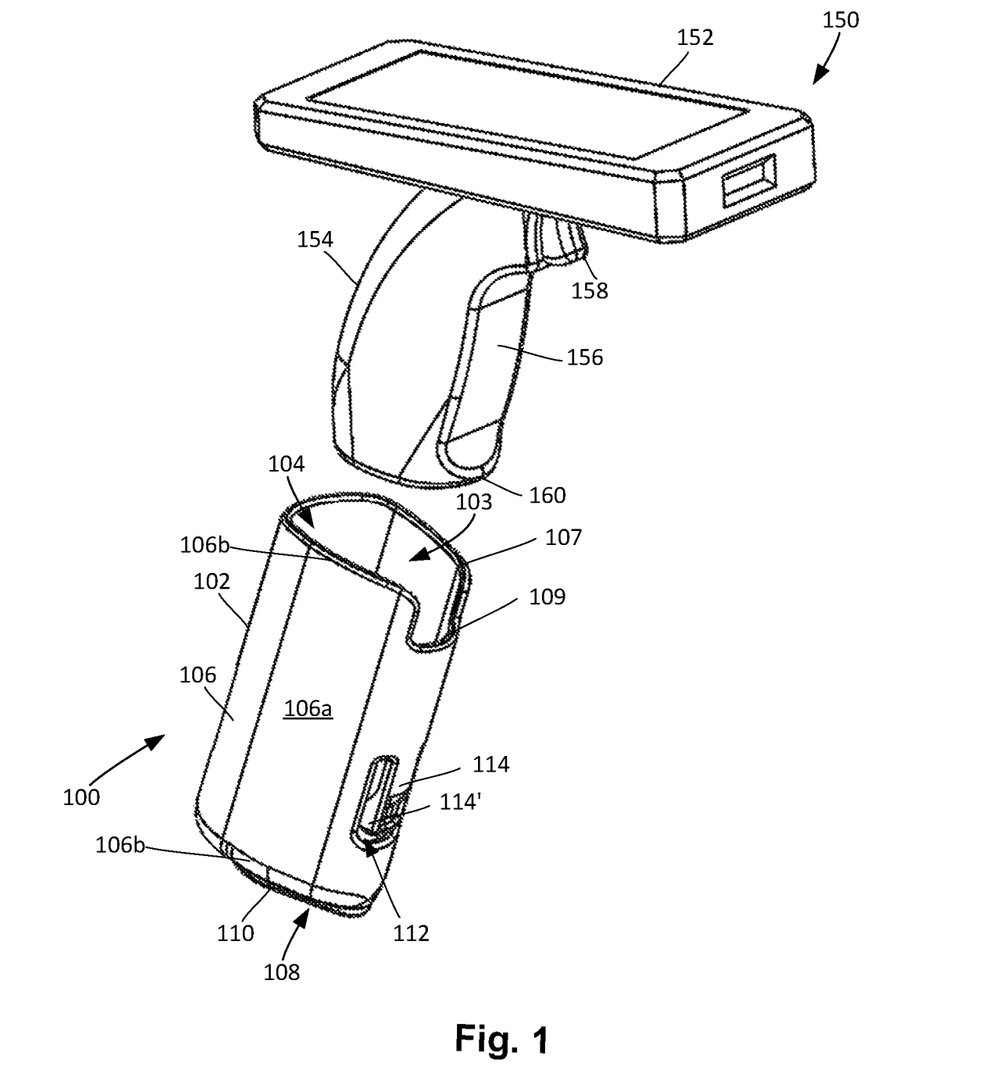
FIG. 1 is a schematic perspective side view of one embodiment of a holder for a scanner gun, as well as an example of a scanner gun, according to the invention.
Figure 2:
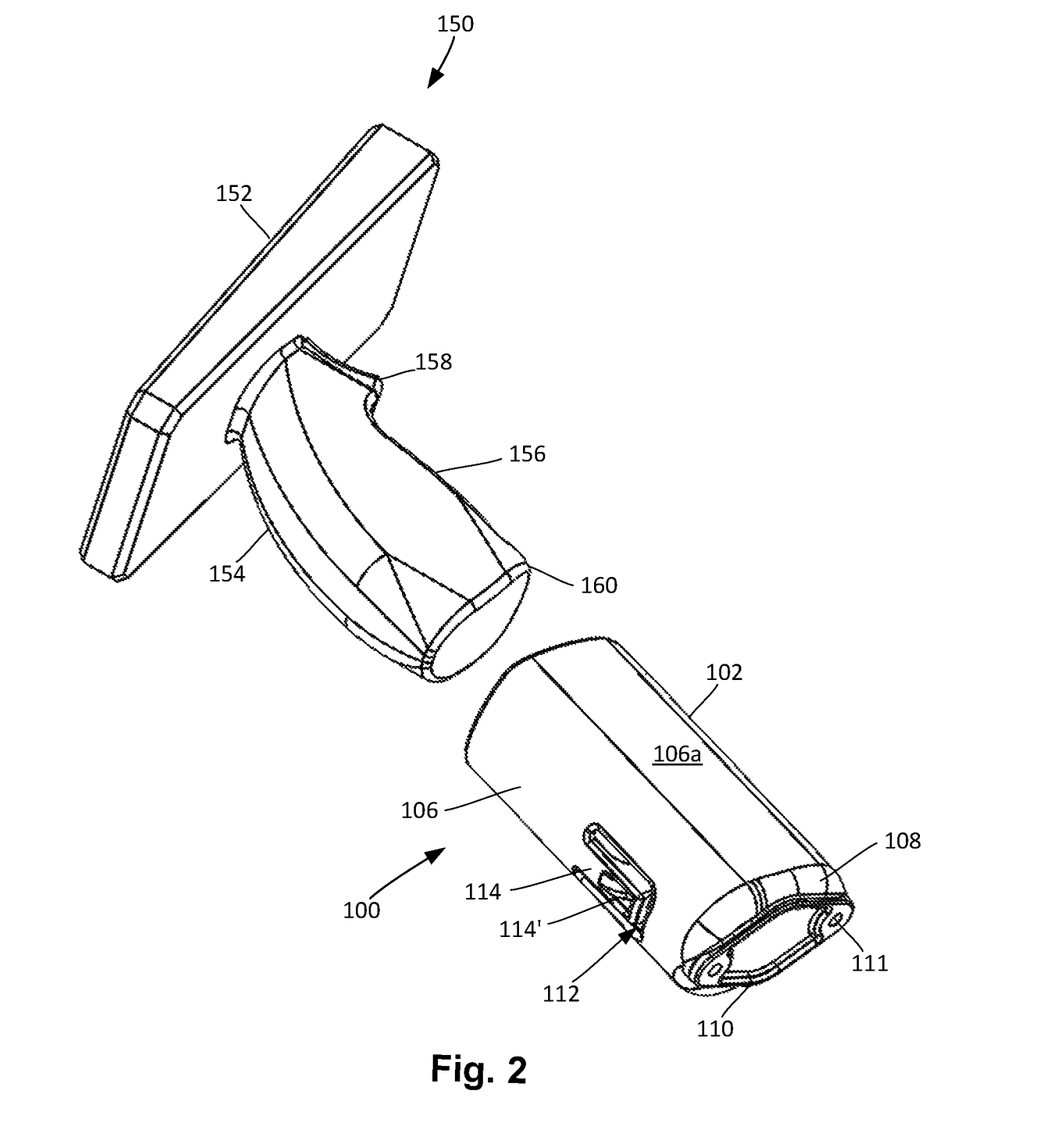
FIG. 2 is a schematic perspective view from a different angle of the holder and scanner gun of FIG. 1, according to the invention

FIGS. 1 and 2 illustrate one embodiment of a holder 100 a scanner gun 150. FIGS. 1 and 2 illustrate one type of scanner gun 150 which has a scanner device 152 with a display and a handle 154, but it will be understood that at least some embodiments of the holder 100 can be used with other types of scanner guns that include a handle. The illustrated handle 154 of FIGS. 1 and 2 is shaped for gripping and a front finger grip region 156, an optional trigger 158, and an optional foot extension 160 that extends out of the handle to fit below the hand of the user. Other scanner guns and handles can include more or fewer components or features. The holder 100 can be made for a particular type of scanner gun 150 or handle 154 or the holder 100 can be made for use with multiple, many, or all different types of scanner guns and handles. The holder 100 may also be used to hold the handles of devices other than a scanner gun.

The holder 100 includes an open-ended body 102 that defines a handle-receiving cavity 103 to receive the handle 154 of the scanner gun 150 through the open first end 104 of the body. In the illustrated embodiment, the second end 108 is closed and includes an optional mounting arrangement 110 (better illustrated in FIG. 2). In other embodiments, the second end 108 can be open or partially open. The body 102 can be formed of any suitable material including, but not limited to, plastic, metal, plastic-covered metal, or the like or any combination thereof. The material of the body 102 is sufficiently rigid to receive and hold the weight of the scanner gun 150 without collapsing, deforming, or breaking during expected operating conditions (included expected operating temperatures (for example, at least 50 degrees Celsius or 120 degrees Fahrenheit.)

The body 102 has at least one sidewall 106 that extends from the open first end 104 to the second end 108. The body 102 may form a cylinder with a circular, oval, or cross-sectional shape or a modified cylinder with a polygonal, symmetric, asymmetric, or other type of non-circular cross-sectional shape and, at least in some embodiments, that cross-sectional shape may vary along the longitudinal axis of the body 102. In the illustrated embodiment, the body 102 forms a modified cylinder with a non-circular cross-sectional shape.

The at least one sidewall 106 can form a solid continuous surface around the body 102 with the exception of one or more openings 112 described below, as illustrated in FIGS. 1 and 2. In other embodiments, the body 102 may include open regions with only a skeleton arrangement of ribs connecting sidewalls 106 adjacent these open regions. For example, in FIG. 1, the region 106a could be open with a ribs 106b at the first and second ends 104, 108 connecting the adjacent sidewall(s) 106.

In at least some embodiments, the body 102 defines a rim 107 around the open end 104 and the rim 107 forms a trigger or handle depression 109 at the first end 104 of the body to receive the optional trigger 158 or other portion of the handle 154 of the scanner gun 150. The trigger or handle depression 109 can also be a visual indication as to the orientation of the scanner gun 150 and handle 154 when the handle is inserted into the body 102 of the holder 100.

Figure 3:
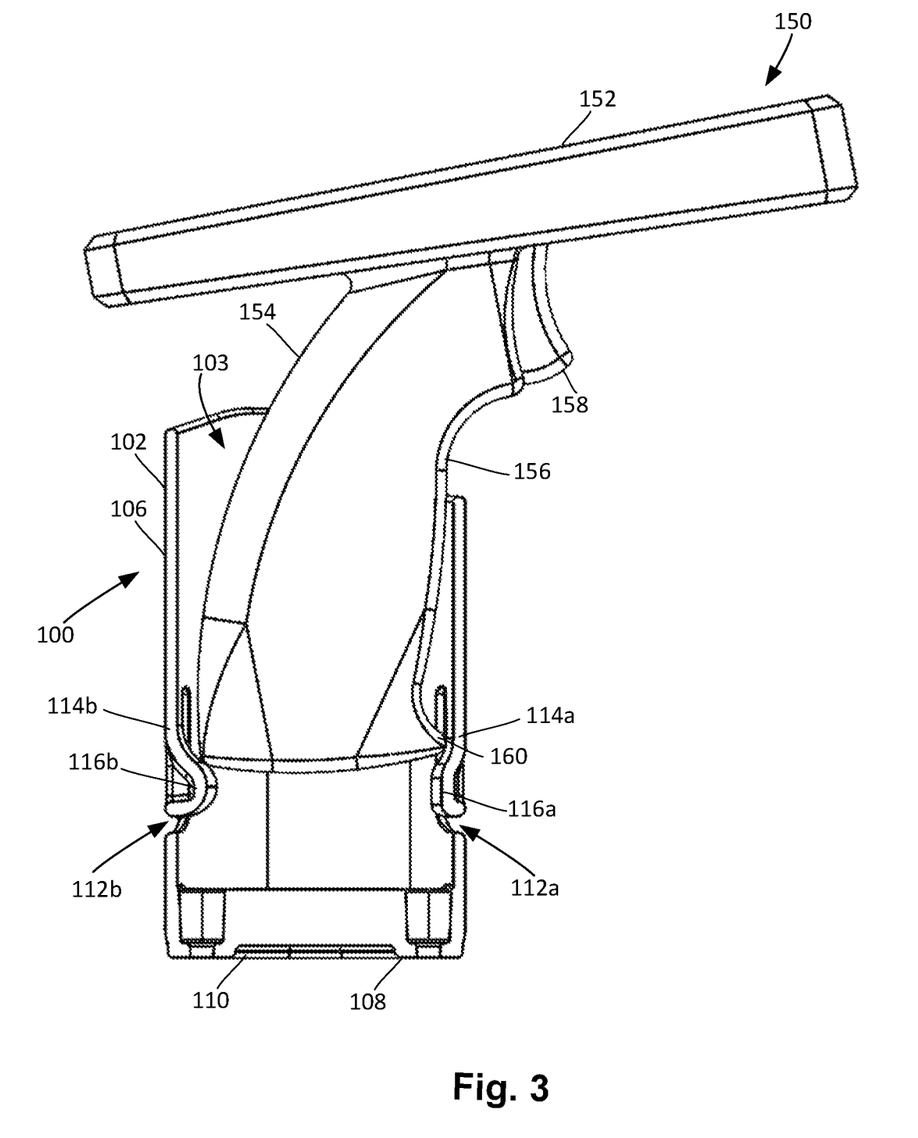
FIG. 3 is a schematic cross-sectional view of the holder and scanner gun of FIG. 1 with the scanner gun partially inserted into the holder, according to the invention.
Figure 4:
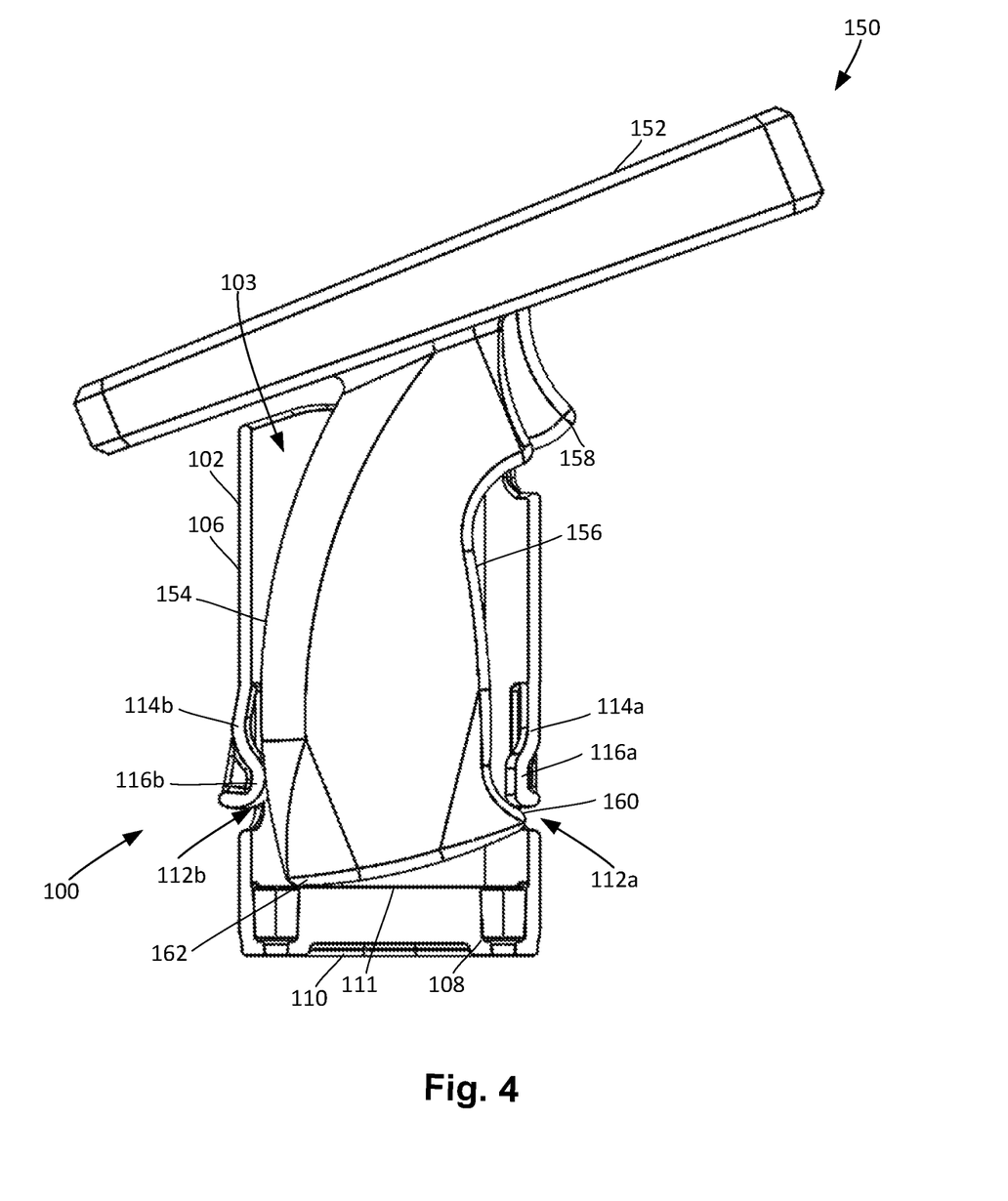
FIG. 4 is a schematic cross-sectional view of the holder and scanner gun of FIG. 1 with the scanner gun fully inserted into the holder, according to the invention.
Figure 5:
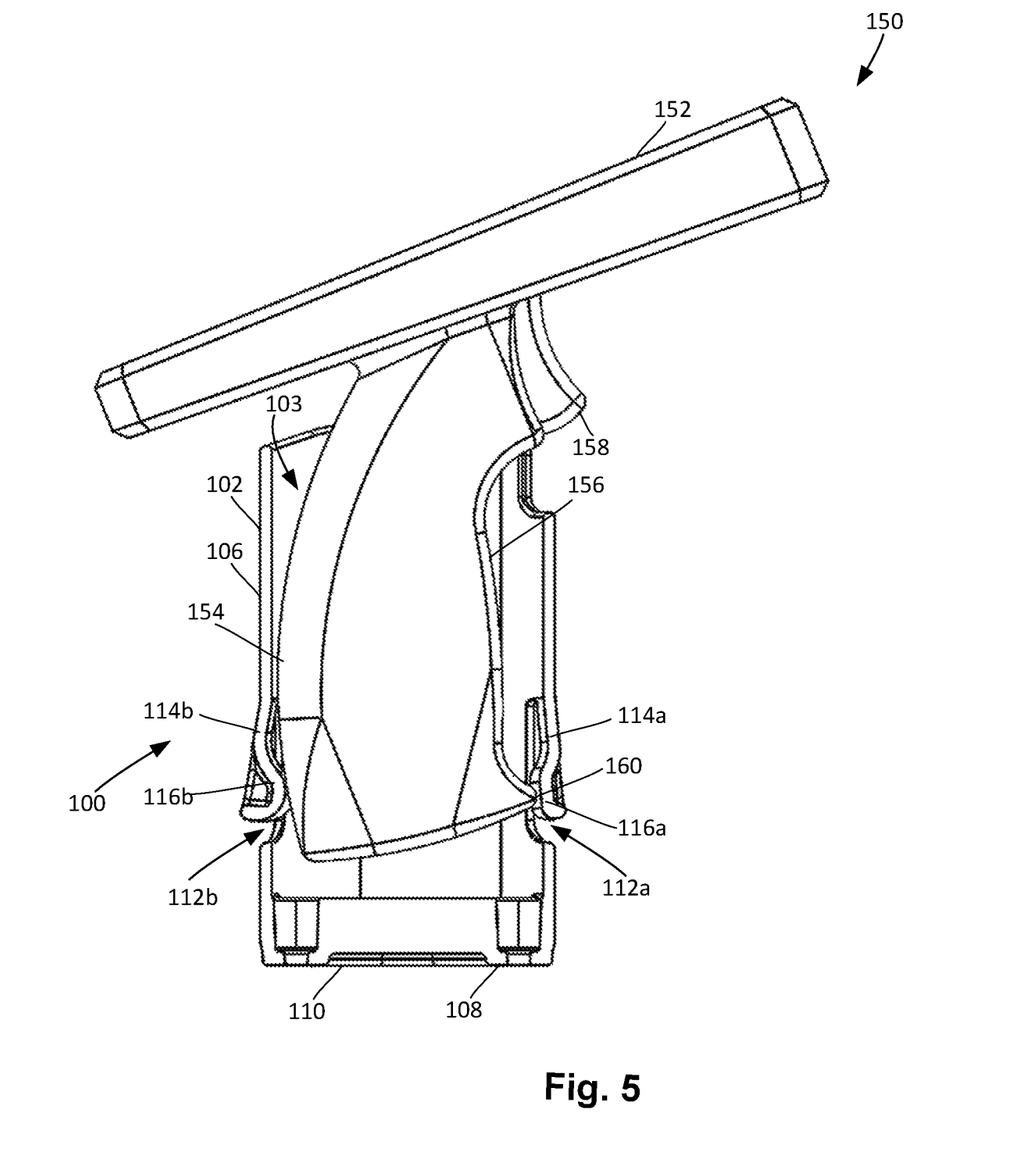
FIG. 5 is a schematic cross-sectional view of the holder and scanner gun of FIG. 1 during removal of the scanner gun from the holder, according to the invention.

The at least one sidewall 106 defines at least one opening 112 that is nearer the second end 108 than the first end 104. The opening 112 can have any suitable shape. In at least some embodiments, as illustrated in FIGS. 3 to 5, the sidewall 106 can define two opposing openings 112a, 112b. FIGS. 1 and 2 also each illustrate a different opening 112 and tab 114 in the holder 100. In at least some embodiments, the opening(s) 112 can facilitate retention of the handle 154 of the scanner gun 150 in the holder 100. For example, in at least some embodiments, a portion of the handle 154 may be received in the opening 112 to retain the handle in the holder 100.

In at least some embodiments, the sidewall 106 further defines a tab 114 that extends into the opening 112. As an example, the tab 114 can have a peninsular arrangement with respect to the opening 112 so that the opening is disposed on three sides of the tab. In at least some embodiments, at least a portion of the tab 114 extends into the handle-receiving cavity 103, as illustrated in FIG. 1, at least when the holder 100 does not have a handle 154 disposed therein. In FIG. 1, the tab 114 includes a concave section 114' that extends into the handle-receiving cavity 103. In other embodiments, the tab 114 can be, for example, a flat tab that does not extend into the handle-receiving cavity 103 or can be a tab with a curved section that extends into the handle-receiving cavity 103 or any other suitable arrangement.

In at least some embodiments, there is no tab. In at least some embodiments, as illustrated in FIGS. 3-5, there can be two openings 112 opposite each other with a tab 114 associated with each opening. In some embodiments, the two openings 112 are not opposite each other. Alternatively, other embodiments can include two openings 112 with one tab 114 associated with one of the openings or two openings with no tabs. In yet other embodiments, there can be three or more openings 112 with no tabs or three or more openings 112 with tab(s) 114 associated with one, some, or all of the openings.

In at least some embodiments, a tab 114 can be pushed outwardly by the handle 154 of the scanner gun 150 when inserted in the handle-receiving cavity 103. In at least some embodiments, a tab 114 can be biased to push against the handle 154 of the scanner gun 150, which, at least in some embodiments, may influence or direct the position of the handle 154 within the handle-receiving cavity 103 of the holder 100. In at least some embodiments, as discussed below, a tab 114 can act as a retention element to retain the handle 154 in the handle-receiving cavity after a portion of the handle has been pushed past the tab.

In the illustrated embodiment, the mounting arrangement 110 on the second end 108 of the holder 100 is diamond-shaped, but it will be understood that the mounting arrangement can be any suitable shape including, but not limited to, square rectangular, circular, oval, triangular, hexagonal, octagonal, or the like. In the illustrated embodiments, the mounting arrangement 110 is plate-like, but it will be understood that other suitable bases can have other three-dimensional shapes. In at least some embodiments, the mounting arrangement 110 includes two or more openings 111 for fastening the mounting arrangement to a mounting apparatus 170 (FIGS. 5 and 6) using the fasteners which can be, for example, screws, bolts, pins, or the like or any other suitable fastener.

FIGS. 3 to 5 illustrate the insertion and removal of the handle 154 of the scanner gun 150 from one embodiment of the holder 100. This embodiment of the holder 100 includes two openings 112a, 112b disposed opposite each other and two tabs 114a, 114b associated with the respective openings. The two tabs 114a, 114b include concave or curved regions 116a, 116b which extend into the handle-receiving cavity 103. In at least some embodiments, the concave or curved region 116b of tab 114b has a larger curve and extends further into the handle-receiving cavity 103.

In FIG. 3, the handle 154 of the scanner gun 150 is inserted into the handle-receiving cavity 103 of the holder 100 until the handle 154 engages one or both of the tabs 114a, 114b. In other embodiments without tabs or with tabs, the handle 154 may be inserted into the handle-receiving cavity 103 without engaging the tabs.

In FIG. 4, the handle 154 is pushed past the tabs 114a, 114b. The tab 114b pushes against the handle 154 to tilt the handle and to bias the foot extension 160 of the handle 154 to engage a bottom portion of the tab 114a or to extend into or out of the opening 112a. The tab 114a (or the opening 112a or both) can retain the handle 154 in the handle-receiving cavity 103 of the holder 100 and may resist removal of the handle from the holder. In at least some embodiments, a portion 162 of the bottom of the handle 154 can rest on the floor 111 of the handle-receiving cavity 103. In other embodiments with or without tabs, the handle 154 may not be biased by a tab toward an opening 112. In at least some embodiments with or without tabs, a portion of the handle 154, such as the foot extension 160, can be received by the opening 112 to retain the handle in the holder 100 or to resist removal of the handle from the holder. A tab 114 (whether straight or curved) or a boundary of the opening 112 may act as a stop to retain the handle in the holder 100 or to resist removal of the handle from the holder.

In FIG. 5, the handle 154 is pulled upwards relative to tab 114a and engages tab 114a in the process or removing the handle 154 from the holder 100. To remove the handle 154 from the holder 110 may require applying force to overcome the resistance of the tab 114a or may require repositioning the handle within the handle-receiving cavity 103 of the holder (for example, by pushing the handle against the tab 114b.)

Figure 6:
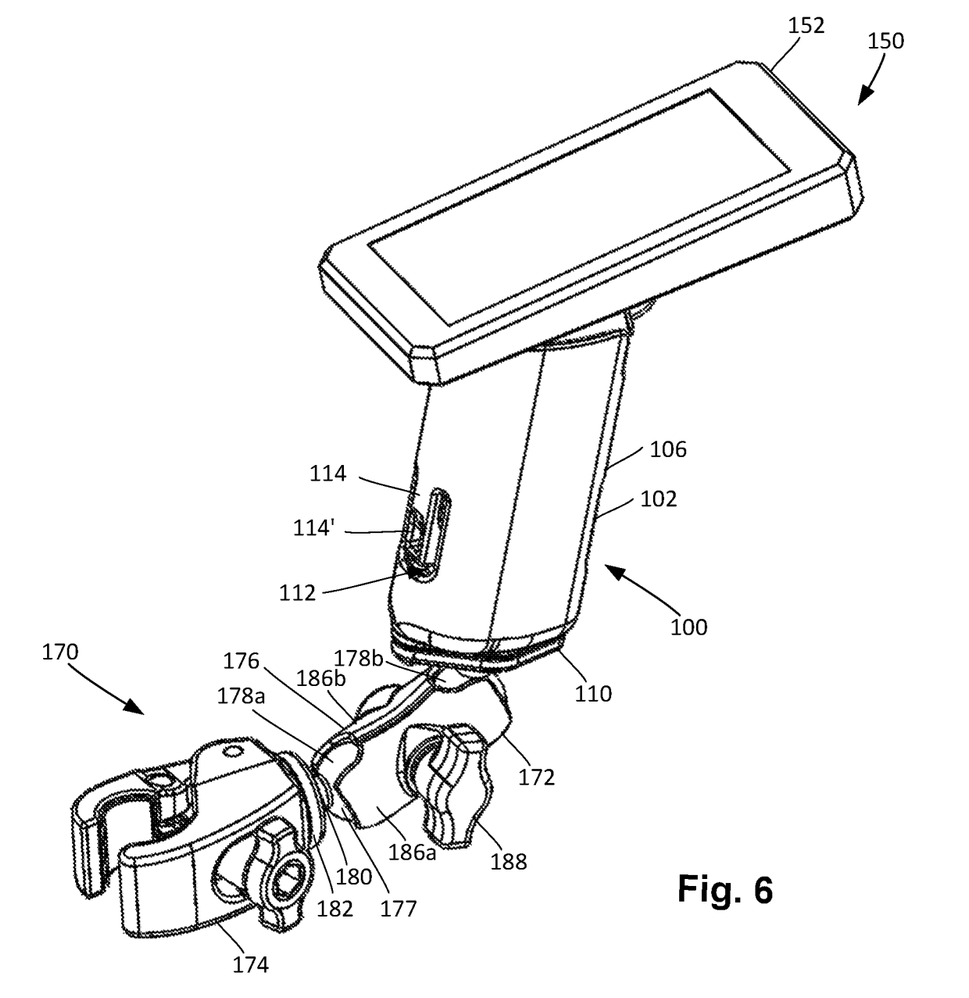
FIG. 6 is a schematic perspective side view of the holder and scanner gun of FIG. 1 with a mounting device attached to the holder, according to the invention.
Figure 7:
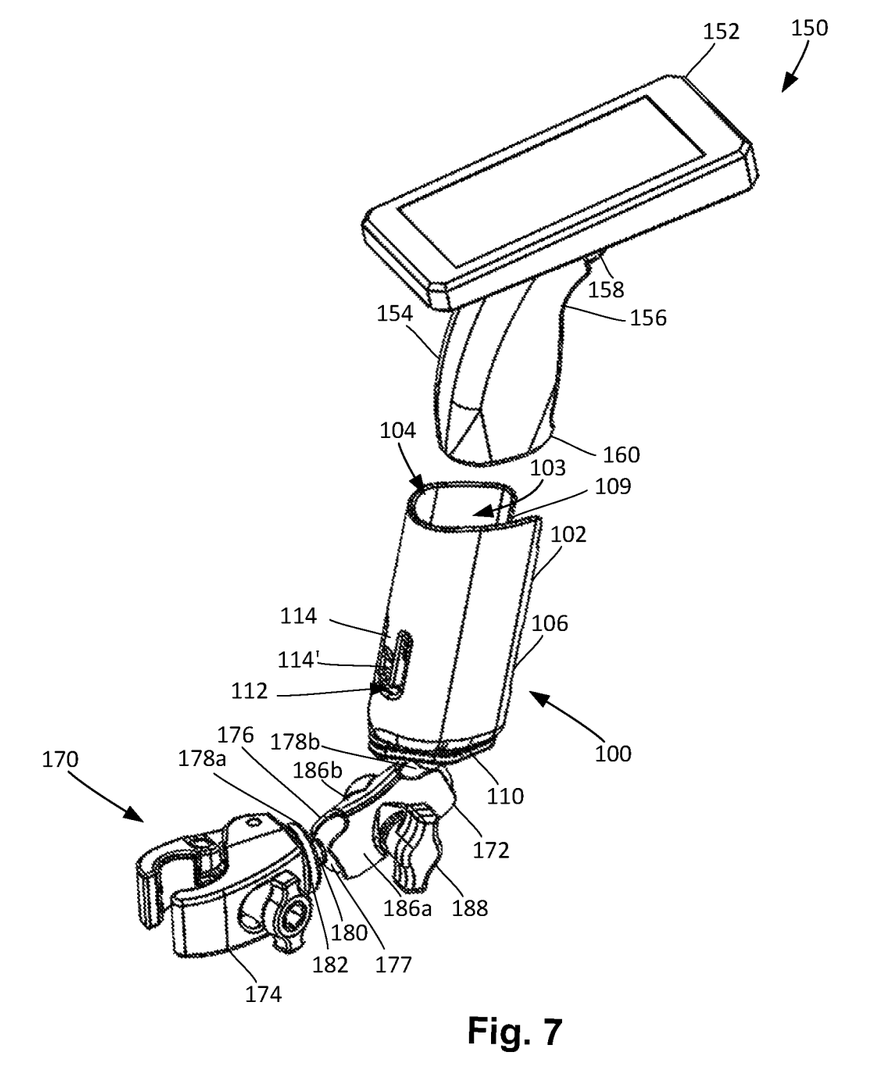
FIG. 7 is a schematic perspective side view of the holder, scanner gun, and mounting device of FIG. 6 with the scanner gun removed from the holder, according to the invention.

FIGS. 6 and 7 illustrate the scanner gun 150 and holder 100 and also illustrate a mounting device 170 attached to the holder. In this embodiment, the mounting device includes a mount 172 and a clamp 174. It will be recognized that the mount 172 or clamp 174 can be replaced with a variety of other apparatuses, devices, or objects for mounting the holder. Examples of such apparatuses, devices, or objects include those described in the following patents and patent applications: U.S. Pat. Nos. 5,845,885; 6,561,476; 7,594,631; 8,186,636; 8,602,376; 10,378,690; and 10,473,150 and U.S. Patent Applications Publication Nos. 2003/0102419; 2007/0117419; 2008/0023606; 2009/0050758; 2009/0108151; and 2015/0030386, all of which are incorporated herein by reference in their entireties.

The mount 172 includes a rigid frame 176 that is attached to two ball mounts 178a, 178b to form an interlockable ball-and-socket joint mechanism as described, for example, in U.S. Pat. No. 5,845,885 or 6,561,476, which are incorporated herein by reference in their entireties. The frame 176 has the form of a split arm assembly and the ball mounts 178a, 178b each include a part-spherical head 177 which, in at least some embodiments, is made of a pressure deformable, resilient elastomeric material, which renders the part-spherical head relatively resiliently radially compressible. Each resiliently deformable part-spherical head 177 is extended on a reduced diameter neck 180 that is attached to a mounting flange 182. The mounting flange 182 is optionally disc-shaped and formed with a quantity of the mounting holes for mounting on the mounting arrangement 110 of the holder or another external mounting surface, such as a mounting surface on the clamp 174, by mechanical fasteners such as screws or any other suitable fasteners.

In at least some embodiments, the frame 176 includes a pair of elongated, rigid arm sections 186a, 186b and a clamping mechanism 188. The arm sections 186a, 186b form pairs of operatively opposing sockets, each having part-spherical surfaces to receive the part-spherical head 177 of the ball mount 178a, 178b to rotate and pivot holder 100 or clamp 174 in a desired rotational and pivotal orientation. The clamping mechanism 188 is then operated to squeeze together the pair of arm sections 186a, 186b about the part-spherical head 177 of the ball mount 178a, 178b for the holder 100 or clamp 174 in the desired rotational and pivotal orientation.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A holder for a device comprising a handle, the holder comprising:
   a body having an open first end, a second end opposite the first end, and at least one sidewall extending from the first end to the second end and defining a handle-receiving cavity configured to receive the handle of the device; and
   a first opening defining a hole through the at least one sidewall of the body and configured to receive a portion of the handle to retain the handle in the holder and resist removal of the handle from the holder, wherein the first opening is a closed shape defined by a perimeter that is surrounded by the at least one sidewall and the first opening is spaced apart from the first end of the body by a portion of the at least one sidewall.

2. A holder for a device comprising a handle, the holder comprising:
   a body having an open first end, a second end opposite the first end, and at least one sidewall extending from the first end to the second end and defining a handle-receiving cavity configured to receive the handle of the device; and
   a first opening formed in the at least one sidewall of the body and configured to receive a portion of the handle to retain the handle in the holder and resist removal of the handle from the holder, wherein the at least one sidewall comprises a first tab extending into the first opening and configured to engage the portion of the handle to retain the handle in the holder and resist removal of the handle from the holder.

3. The holder of claim 2, wherein the first tab comprises a curved portion that is biased inwardly into the handle-receiving cavity.

4. The holder of claim 2, further comprising a second opening formed in the at least one sidewall of the body.

5. The holder of claim 4, wherein the at least one sidewall further comprises a second tab extending into the second opening and configured to engage another portion of the handle to push the handle toward the first opening.

6. The holder of claim 5, wherein the second tab comprises a curved portion that is biased inwardly into the handle-receiving cavity.

7. The holder of claim 1, wherein the body defines a rim at the first end and a handle depression in the rim to accommodate a portion of the handle or a trigger on the handle.

8. The holder of claim 2, wherein the second end is closed.

9. The holder of claim 8, further comprising a mounting arrangement disposed on the second end of the holder and configured for coupling a mounting device.

10. A mounting system, comprising:
    the holder of claim 9; and
    a mounting device coupled, or coupleable, to the holder.

11. The mounting system of claim 10, wherein the mounting device comprises a ball mount coupled, or coupleable, to the mounting arrangement of the holder.

12. The mounting system of claim 10, wherein the mounting device comprises a clamp.

13. A holder for a scanner gun comprising a scanner device and a handle coupled to the scanner device, the holder comprising:
- a body having an open first end and at least one sidewall defining a handle-receiving cavity configured to receive the handle of the scanner gun;
- a first opening formed in the at least one sidewall;
- a first tab formed in the at least one sidewall of the body and extending into the first opening;
- a second opening formed in the at least one sidewall; and
- a second tab formed in the at least one sidewall of the body and extending into the second opening.

14. The holder of claim 13, wherein the first tab comprises a portion that is biased inwardly into the handle-receiving cavity.

15. The holder of claim 13, wherein the second tab comprises a portion that is biased inwardly into the handle-receiving cavity.

16. The holder of claim 13, wherein the holder is configured to secure the handle of the scanner gun when a distal portion of the handle is inserted into the handle-receiving cavity past the first and second tabs, wherein the second tab is configured to push the handle toward the first tab and the first tab is configured to act as a stop for removal of the handle from the body.

17. The holder of claim 13, wherein the body defines a rim at the first end and a handle depression in the rim to accommodate a portion of the handle or a trigger on the handle.

18. The holder of claim 13, wherein the body has a second end opposite the first end and the second end is closed.

19. The holder of claim 18, further comprising a mounting arrangement disposed on the second end of the holder and configured for coupling a mounting device.

20. A mounting system, comprising:

the holder of claim 19; and a mounting device coupled, or coupleable, to the holder.

\* \* \* \* \*